United States Patent
Kowalski et al.

(10) Patent No.: US 12,061,654 B2
(45) Date of Patent: Aug. 13, 2024

(54) FULFILLMENT GUIDANCE DEVICES, SYSTEMS, AND METHODS

(71) Applicant: ZEBRA TECHNOLOGIES CORPORATION, Lincolnshire, IL (US)

(72) Inventors: Matthew Louis Kowalski, Merrick, NY (US); David Bellows, Old Westbury, NY (US); Nicole Daphne Tricoukes, Seaford, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 539 days.

(21) Appl. No.: 17/186,219

(22) Filed: Feb. 26, 2021

(65) Prior Publication Data
US 2022/0277043 A1 Sep. 1, 2022

(51) Int. Cl.
| | |
|---|---|
| *G06F 16/906* | (2019.01) |
| *G02B 27/01* | (2006.01) |
| *G06F 18/213* | (2023.01) |
| *G06F 18/23211* | (2023.01) |
| *G06Q 10/0833* | (2023.01) |
| *G06Q 10/087* | (2023.01) |

(52) U.S. Cl.
CPC ......... *G06F 16/906* (2019.01); *G02B 27/017* (2013.01); *G06F 18/213* (2023.01); *G06F 18/23211* (2023.01); *G06Q 10/0833* (2013.01); *G06Q 10/087* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 8,175,925 B1 | 5/2012 | Rouaix | |
| 10,435,279 B2 * | 10/2019 | Taylor | ........................ G01S 1/72 |
| 2016/0189285 A1 * | 6/2016 | Mellott | ................... G06F 16/29 |
| | | | 705/26.9 |
| 2016/0210738 A1 | 7/2016 | Curlander et al. | |

(Continued)

OTHER PUBLICATIONS

Aggarwal, Charu C., and Jiawei Han. "A survey of RFID data processing." Managing and Mining Sensor Data (2013): 349-382. (Year: 2013).*

(Continued)

*Primary Examiner* — Uyen T Le

(57) ABSTRACT

Fulfillment guidance devices, systems, and methods are disclosed herein. An example device includes a memory; a communications interface; and a processor to: obtain, from a location tracking system deployed in a facility containing items of a plurality of item types, current locations for each of the items; select a subset of the items having a common type, and satisfying a proximity criterion; generate and store, in the memory, an item cluster definition having a type indicator corresponding to the common type, a count of items in the subset, and a single cluster location derived from the current locations of the items in the subset; obtain an item request including one of the item types; determine that the one of the item types matches the type indicator of the cluster definition; responsive to the determination, send at least a portion of the cluster definition to a mobile device within the facility.

20 Claims, 5 Drawing Sheets

(56) References Cited

U.S. PATENT DOCUMENTS

| | | |
|---|---|---|
| 2016/0238692 A1 | 8/2016 | Hill et al. |
| 2018/0350144 A1 | 12/2018 | Rathod |
| 2019/0018567 A1 | 1/2019 | Murphy et al. |
| 2019/0072390 A1 | 3/2019 | Wang et al. |
| 2019/0272425 A1 | 9/2019 | Tang et al. |
| 2019/0294889 A1* | 9/2019 | Sriram .............. G06F 18/24143 |
| 2019/0325385 A1* | 10/2019 | Tingler .............. G06K 19/0723 |
| 2020/0005540 A1 | 1/2020 | Challagolla et al. |
| 2020/0249819 A1* | 8/2020 | Berquam ............ G06F 3/04815 |
| 2020/0364662 A1 | 11/2020 | Avery, Jr. et al. |
| 2021/0150462 A1* | 5/2021 | Leitermann .......... G06Q 10/087 |

OTHER PUBLICATIONS

International Search Report and Written Opinion for International Application No. PCT/US2021/063117 mailed on Mar. 1, 2022.

\* cited by examiner

FULFILLMENT GUIDANCE DEVICES, SYSTEMS, AND METHODS

BACKGROUND

A wide variety of activities may affect the retrieval of items from storage in a facility, e.g. for delivery to a customer or for use elsewhere in the facility. For example, retail facilities may employ workers to retrieve items to fulfill online orders placed by customers, and manufacturing facilities may employ workers to retrieve items for transport to a production line. Inventory tracking systems can be deployed in such facilities to track locations of the items. However, the size of such facilities and the number of items therein may complicate the use of item location data to guide workers in item retrieval.

SUMMARY

In an embodiment, the present invention is a computing device, comprising: a memory; a communications interface; and a processor configured to: obtain, from a location tracking system deployed in a facility containing items of a plurality of item types, current locations for each of the items; select a subset of the items (i) having a common type, and (ii) satisfying a proximity criterion; generate and store, in the memory, an item cluster definition having (i) a type indicator corresponding to the common type, (ii) a count of items in the subset, and (iii) a single cluster location derived from the current locations of the items in the subset; obtain an item request including one of the item types; determine that the one of the item types matches the type indicator of the cluster definition; and responsive to the determination, send at least a portion of the cluster definition to a mobile device within the facility.

In another embodiment, the present invention is a method, comprising: obtaining, from a location tracking system deployed in a facility containing items of a plurality of item types, current locations for each of the items; selecting a subset of the items (i) having a common type, and (ii) satisfying a proximity criterion; generating and storing an item cluster definition having (i) a type indicator corresponding to the common type, (ii) a count of items in the subset, and (iii) a single cluster location derived from the current locations of the items in the subset; obtaining an item request including one of the item types; determining that the one of the item types matches the type indicator of the cluster definition; and responsive to the determination, sending at least a portion of the cluster definition to a mobile device within the facility.

In a further embodiment, the present invention is a system, comprising: a mobile device; a location tracking system; and a server configured to: obtain, from the location tracking system deployed in a facility containing items of a plurality of item types, current locations for each of the items; select a subset of the items (i) having a common type, and (ii) satisfying a proximity criterion; generate and store an item cluster definition having (i) a type indicator corresponding to the common type, (ii) a count of items in the subset, and (iii) a single cluster location derived from the current locations of the items in the subset; obtain an item request including one of the item types; determine that the one of the item types matches the type indicator of the cluster definition; and responsive to the determination, send at least a portion of the cluster definition to the mobile device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
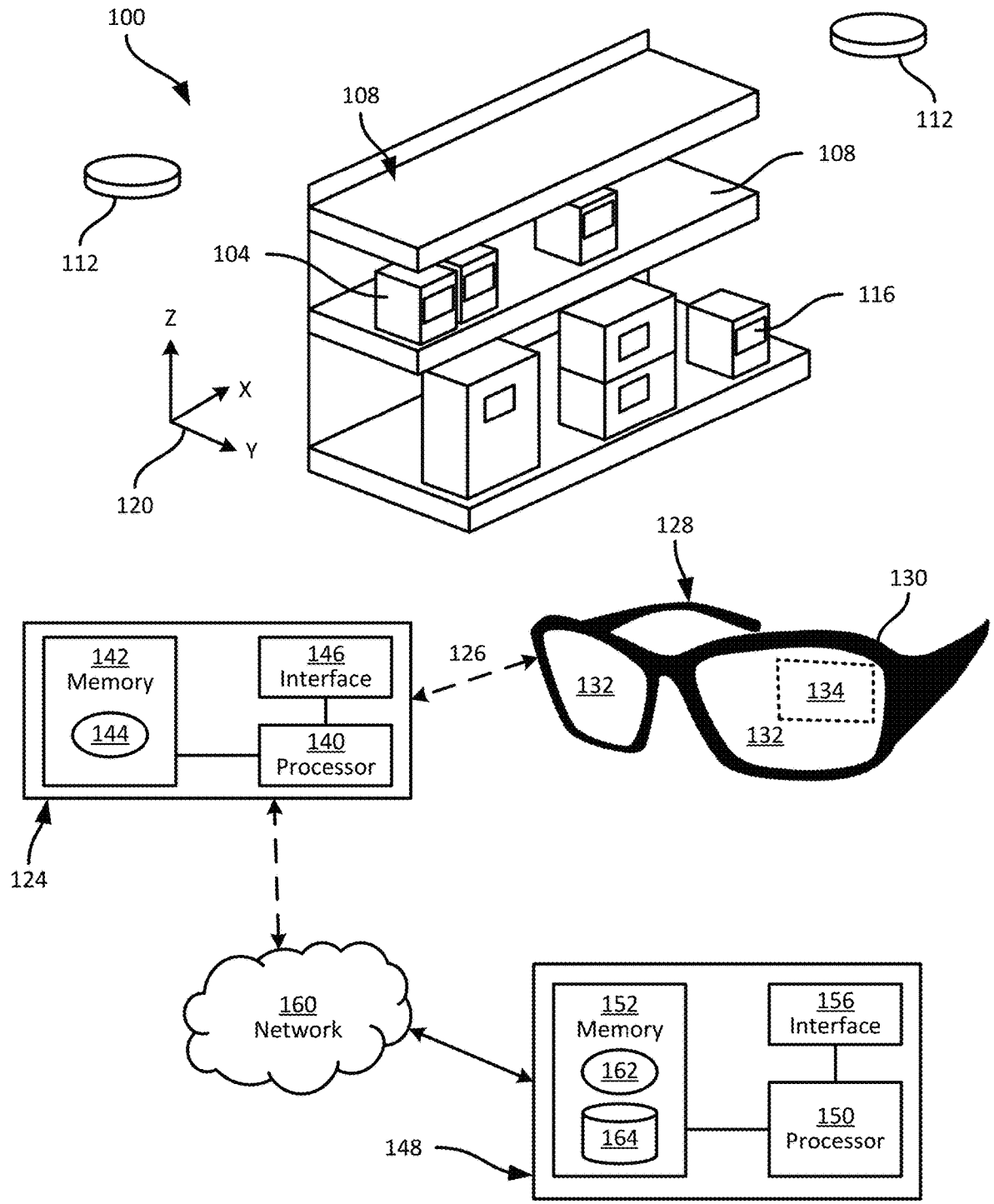
FIG. 1 illustrates a system for item request fulfillment guidance.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 illustrates a system 100 for fulfillment guidance. In particular, the system 100 includes components and corresponding functionality to provide guidance to a worker in a facility for retrieving one or more items. The retrieval of such items is generally referred to as a fulfillment process and may be performed to fulfill an online order received by a retailer, to retrieve stock for transport to another facility or to another portion of the same facility (e.g. a manufacturing facility, health care facility, or the like), or the like. In general, the fulfillment process includes at least the receipt of an item type to be retrieved and the provision of an instruction to a worker, autonomous apparatus (such as a robot), or the like, to retrieve the item.

The items 104 can be stored in a variety of ways throughout such facilities. The example of FIG. 1 illustrates items 104 disposed on a support structure 108 such as a shelf module. The facility may contain a plurality of such support structures, and/or other forms of support structures including pallets, tables, peg boards, and the like. The items 104 may also be of various different types, e.g. identified by a stock-keeping unit (SKU) identifier, a universal product code (UPC), or the like. That is, a given identifier may be applied to every item of the same type, e.g. as a barcode or other indicium. As will be apparent to those skilled in the art, the facility may contain numerous distinct types of items, as well as numerous items of each type.

The scale of the facility, as well as the number of item types and individual instances of each type of item, may impact the ease with which the above-mentioned worker or autonomous apparatus can locate and retrieve a requested item. Some facilities may maintain planograms, which map the intended locations of item types in the facility. However, the actual layout of items in the facility does not always comply with the planogram, and stock levels are variable, such that some locations intended to house a certain item type may store few or no items of that type at certain points in time. Furthermore, items may be intentionally or unintentionally misplaced relative to the planogram, and/or the planogram could simply be incorrect or outdated.

The facility may therefore contain a location tracking system, such as a set of location sensors 112. Two such sensors 112 are shown in FIG. 1, e.g. mounted to a ceiling or other suitable structure in the facility, but it will be apparent that the system 100 can contain any suitable number of sensors 112 to provide adequate coverage of the support structures 108 within the facility. The sensors 112 can be, in some examples, radio frequency identification (RFID) readers coupled to a suitable controller, e.g. a central controller configured to receive data from each sensor 112 and derive item locations therefrom. The readers 112 are configured to detect machine-readable indicia 116 on the items 104, such as RFID tags. Each tag 116 includes a unique identifier, such as an electronic product code (EPC), which is distinguished from the item type identifiers above in that the unique tag identifier is specific to a single item 104, whereas the item type identifiers are shared by all items of the same type. Each tag 116 may also contain an item type identifier such as the above mentioned SKU or UPC.

In other examples, the readers 112 can employ other sensing technologies, and the nature of the indicia 116 can be varied accordingly. In the case of an RFID-based location tracking system, as will be apparent to those skilled in the art, each sensor 112 periodically (e.g. once per ten seconds, or any other suitable frequency) detects any tags 116 in the vicinity of that sensor 112, and reports such detections to the above-mentioned controller. Each detection includes the unique identifier of the tag 116, as well as a proximity indicator, such as a signal strength detected by the sensor 112. The controller determines, based on the detections received from the sensors 112, the location of each tag 116 in the facility. For example, tag locations may be determined according to a frame of reference 120 previously established in the facility.

The tag locations, which correspond to item locations because the tags 116 are affixed to the items 104, can be used to provide guidance to a worker in the facility, who has been tasked with retrieving one or more of the items 104. For example, the worker may carry a mobile computing device 124 connected (e.g. via a short-range wireless link 126 such as a Bluetooth connection) with a head-mounted display device 128, also referred to herein as a heads-up display (HUD) 128. In the illustrated example, the HUD 128 is implemented in an eyeglass format, with a frame 130 supporting lenses 132. At least one of the lenses 132 includes a display area 134, implemented by a projector of the HUD 128 or other suitable display technology.

The mobile computing device 124 can include a smart phone, tablet computer, or the like, which is configured to provide data to the HUD 128 for presentation via the display area 134, such that the worker wearing the HUD 128 can see such information without withdrawing the device 124 from a pocket, belt, or the like holding the device 124.

The device 124 includes a processor 140 (e.g. one or more central processing units), interconnected with a non-transitory computer readable storage medium, such as a memory 142. The memory 142 includes a combination of volatile memory (e.g. Random Access Memory or RAM) and non-volatile memory (e.g. read only memory or ROM, Electrically Erasable Programmable Read Only Memory or EEPROM, flash memory). The processor 140 and the memory 142 each comprise one or more integrated circuits.

The memory 142 stores computer readable instructions for execution by the processor 140. In particular, the memory 142 stores a fulfillment guidance application 144 (also referred to simply as the application 144) which, when executed by the processor 140, configures the processor 140 to receive item location data from a computing device such as a server 148 of the system 100, discussed in greater detail below, and to present such information via the display area 134.

The device 124 also includes a communications interface 146 enabling the device 124 to communicate with other computing devices, including the HUD 128, and the server 148. The communications interface 146 therefore includes suitable hardware elements (e.g. transceivers, ports, and the like) and corresponding firmware according to the communications technology employed to communicate with such other devices. The device 124 may include additional components not shown in FIG. 1, such as a display, a touch screen, a keypad, and the like. In some examples, the components of the device 124 shown in FIG. 1 may be integrated with the HUD 128 as a single device.

The device 124 therefore enables an instruction to be provided to the worker operating the device 124 to retrieve an item, including the type of item to be retrieved and location information indicating where the item may be retrieved from. However, in some facilities the size of the facility and the number of items therein may result in a number of possible locations from which an item can be retrieved that is too large to readily present on the display area 134. Further, such a facility may employ a number of workers, each with a distinct device 124. The transmission of significant volumes of item location data to all such devices may result in wireless congestion in the facility, reducing fulfillment efficiency. Still further, which device 124 to allocate an item to (e.g. when there are multiple devices 124 present) may be selected in part by comparing candidate item locations to candidate device locations. As will be apparent, as the number of individual item locations increases, so does the computational load imposed by such comparisons.

The system 100 therefore includes components and functionality enabling the provision of location data to a worker via the device 124, while mitigating the above-mentioned negative effects on local network performance, computational load, and the like. Further, in order to efficiently utilize and deploy the human and digital resources in the facility to make logical business decisions, proper task management prioritization would be needed. It would therefore be best to avoid less productive and potentially confusing attempts to transmit the abundance of item location data to all or many of the devices 124 carried by the workers. Instead, sending specific location data to targeted devices 124 ensures from a workforce management perspective that the appropriate workers are clearly directed for suitable tasks.

Specifically, the system 100 includes the above mentioned server 148, which is configured to process item locations determined by the sensors 112 to generate location data therefrom that can be delivered to the device 124 to provide guidance to the worker, and that can also be employed to more efficiently select one of a number of devices 124 to fulfill a given order.

The server 148 includes a processor 150 (e.g. one or more central processing units), interconnected with a non-transitory computer readable storage medium, such as a memory 152. The memory 152 includes a combination of volatile memory (e.g. Random Access Memory or RAM) and non-volatile memory (e.g. read only memory or ROM, Electrically Erasable Programmable Read Only Memory or EEPROM, flash memory). The processor 150 and the memory 152 each comprise one or more integrated circuits. The server 148 also includes a communications interface 156 enabling the server 148 to communicate with other computing devices, including the device 124. Such communication may be effected via a network 160, such as a local area network (LAN) or a suitable combination of local and wide-area networks.

The memory 152 stores computer readable instructions for execution by the processor 150. In particular, the memory 152 stores a fulfillment guidance application 162 (also referred to simply as the application 162) which, when executed by the processor 150, configures the processor 150 to obtain item locations via the sensors 112, and to process such item locations to generate location data that may be provided to the device 124 more efficiently than the item locations themselves. The memory 152 also stores a repository 164 containing the item locations and the additional location data mentioned above.

Figure 2:
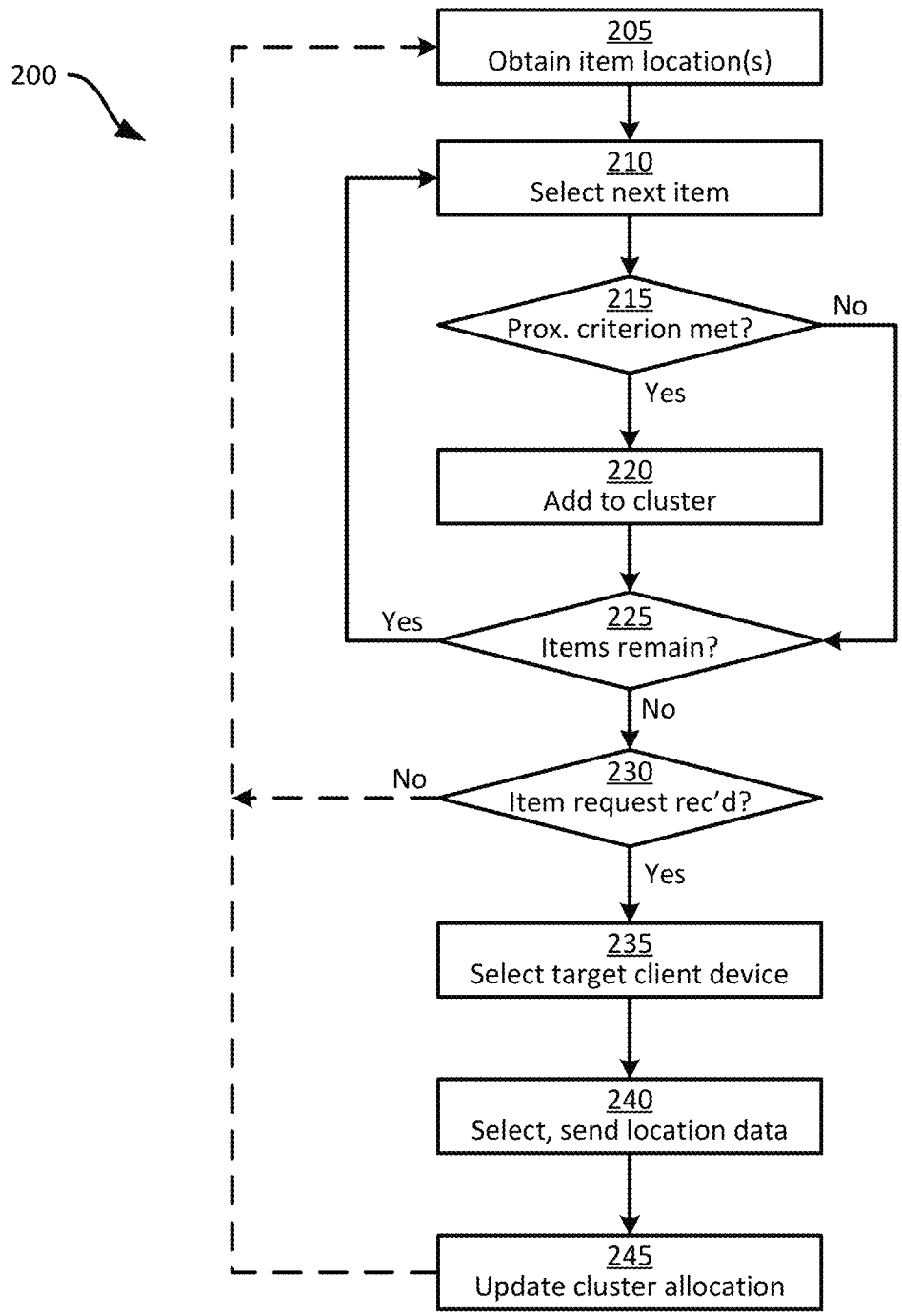
FIG. 2 is a flow chart of a method of providing fulfillment guidance for item requests.

Turning to FIG. 2, a method 200 of processing location data from the sensors 112 to provide fulfillment guidance to the device 124 (and any other devices 124 deployed in the facility) is illustrated. The method 200 will be described below in conjunction with an example performance of the method 200 in the system 100. In the discussion below, the blocks of the method 200 are performed by the server 148.

At block 205, the server 148 is configured to obtain locations for the items 104 in the facility. More specifically, the server 148 obtains locations for any items having tags 116 affixed thereto. The facility may also contain items 104 without tags 116, but such items are ignored in the remaining discussion below. As mentioned above, obtaining the item locations can include receiving the locations from the tracking system consisting of the sensors 112 and associated controller. In some examples, the server 148 itself may implement the controller, and may therefore obtain the item locations by receiving raw tag detections from the sensors 112 and generating the item locations.

Each item location includes coordinates of the item 104 in the frame of reference 120, and is associated with the unique identifier of the tag 116 affixed to that item 104, as well as the type identifier associated with the item 104. The current locations of the items 104 are stored in the repository 164 in association with the unique identifiers and type identifiers mentioned above.

At block 210, the server 148 is configured to select an item 104 for processing. As discussed below, each of the items 104 for which a current location is stored in the repository 164 is evaluated to determine whether the item 104 is sufficiently close to another item 104 of the same type. Items 104 that satisfy a proximity criterion (i.e. items 104 that are sufficiently close to one another) are represented at the server 148 by an item cluster definition, as will be described below. The item 104 selected at block 210 can be selected at random, or as the first location received, or by any other suitable selection mechanism. The specific item 104 selected at block 210 may be given a higher priority, for example, because its item type may be known to be of high velocity and/or high value, so evaluating this item may be of more operational interest. For example, in retail, this item may be a popular, and thus fast-selling, promotional item that is expected to have a frequently changing quantity on the various support structures 108 throughout the facility, or it may be an item with significant economic value, such as cost to the retailer or price to the customer, that would make it a higher priority to evaluate. While the order in which items 104 are to be processed as discussed below may be prioritized in some embodiments, the individual steps outlined in the method 200 are intended to be executed the same way with resulting consistent performance regardless of any differences among the items.

Figure 3:
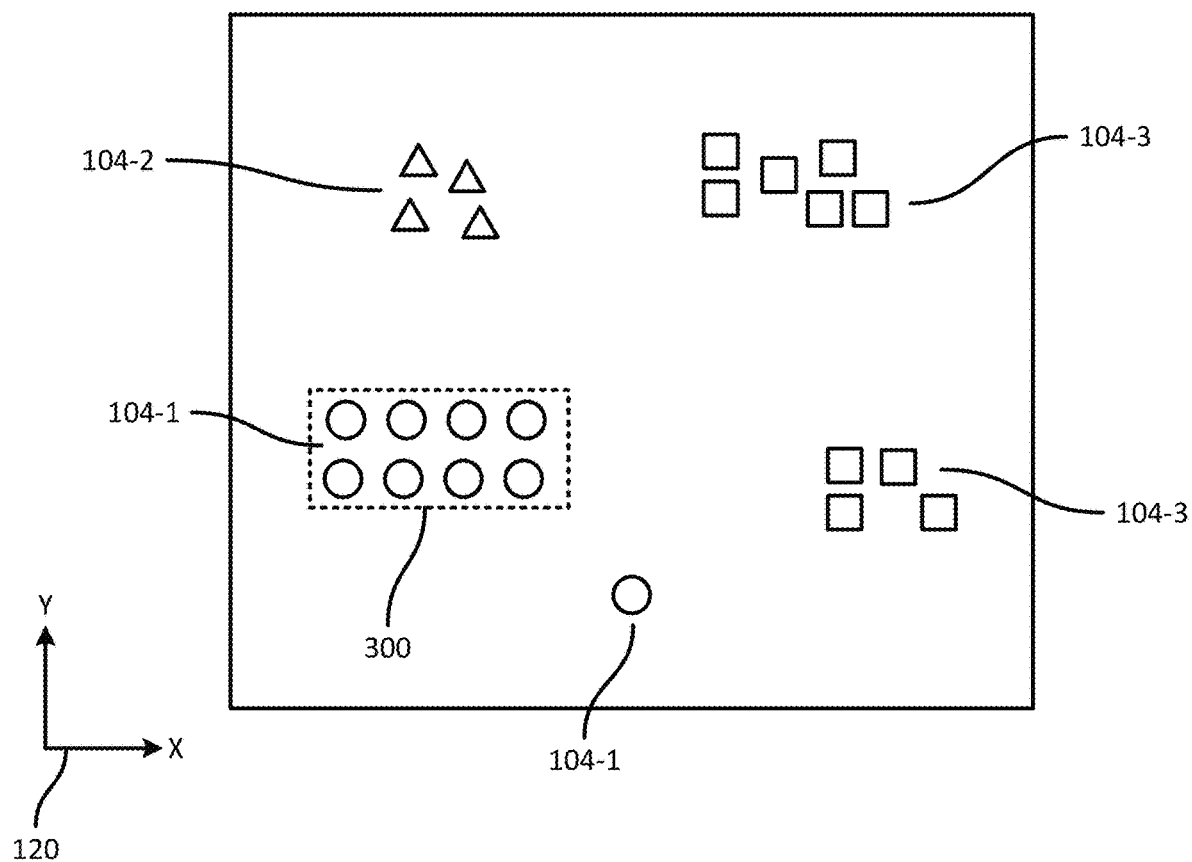
FIG. 3 is a diagram of an overhead view of items in a facility in which the system of FIG. 1 is deployed.

Referring to FIG. 3, a simplified overhead view of a facility is shown, with various items 104 of three different types disposed therein. The items 104 are disposed on support structures 108, which are omitted from FIG. 3 for clarity. In particular, FIG. 3 illustrates items 104 of three distinct types, 104-1, 104-2, and 104-3. The items 104 are generally stored in contiguous sets of locations within the facility, although some items 104 may also be stored separately from other items of the same type. For example, in the overhead view of FIG. 3, most of the items 104-1 are stored in an area 300, such as a designated portion of a support structure 108. Another item 104-1, however, is stored outside the area 300, e.g. because that item 104-1 was misplaced, or because there are two or more designated areas for storage of items 104-1. Similarly, the items 104-2 are stored in another area, and the items 104-3 are stored in two distinct areas of the facility. One example of an item stored in multiple places within a facility is soda in a grocery store, where this item can be typically found in the beverage aisle, at the deli counter, at point of sale locations, and often on promotional endcaps. Another example of an item stored in multiple places within a facility is a specific style shirt on sale at an apparel retailer, where this item can be found near the facility's customer entrance, as well as in its original department and possibly also in a clearance location of the facility's retail space.

Returning to FIG. 2, at block 215 the server 148 is configured to determine whether any other items 104 of the same type (that is, other than the item selected at block 210) satisfy a proximity criterion relative to the selected item 104. The proximity criterion is selected to indicate whether the selected item 104 and the other item(s) 104 of the same type are close enough to be represented as a single cluster of the same type of item. Generally, such items 104 are stored on a support structure 108 in a contiguous block (i.e. not separated by other items). As will be apparent in the discussion below, a location of a cluster of items 104 may be provided to the device 124 as fulfillment guidance with a similar degree of effectiveness to providing individual item locations, while reducing the network and computational load imposed by transmission to the device 124.

Figure 4:
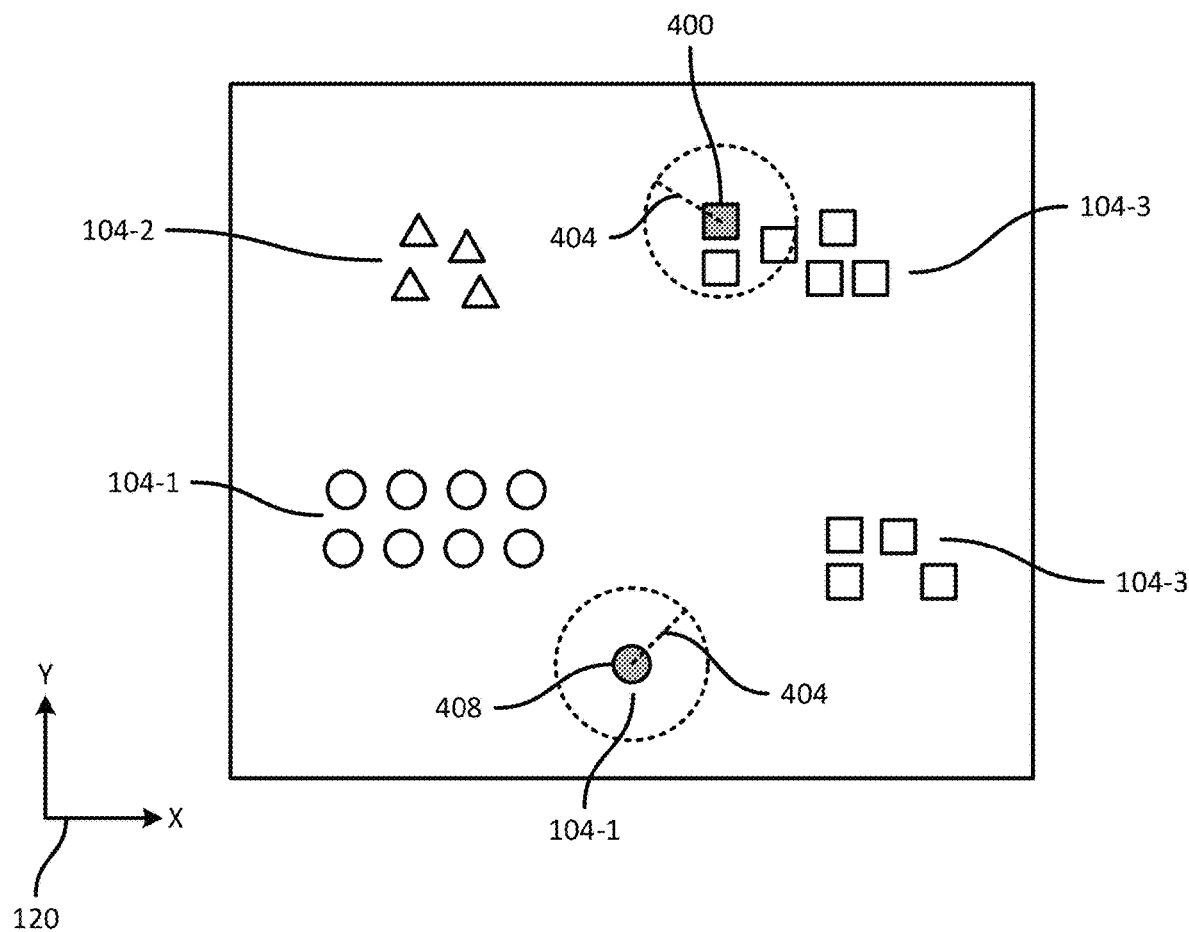
FIG. 4 is a diagram of the items from FIG. 3 illustrating an evaluation of a proximity criterion at block 215 of the method of FIG. 2.

The proximity criterion, in this example, is a threshold applied to a distance between the item 104 from block 210 and other items 104. For example, turning to FIG. 4, a selected item 400 (of the type 104-3) is highlighted, and a radius 404 indicates a threshold distance applied at block 215. Any other items 104 that share the same item type as the selected item 400 and fall within the radius 404 are considered to satisfy the proximity criterion at block 215. In FIG. 4, it is evident that two other items 104-3 satisfy the proximity criterion.

Returning again to FIG. 2, when the determination at block 215 is affirmative, the server 148 proceeds to block 220, at which the item 104 from block 210 and any items 104 that satisfied the proximity criterion are employed to generate or update an item cluster definition. The item cluster definition will be described in greater detail below. Following block 220, the server 148 determines whether any items 104 remain to be processed (i.e. have not yet been selected via block 210), and returns to block 210 if so. On the other hand, following a negative determination at block 215, the item selected at block 210 is not added to a cluster, and the server 148 proceeds directly to block 225.

For example, referring to FIG. 4, a further selected item 408, of the type 104-1, has no items of the type 104-1 within the radius 404 thereof, and therefore is not added to a cluster. As will now be apparent, following additional performances of blocks 210, 215, 220 and 225, additional items 104 are added to clusters based on proximity. While the example shown in FIG. 4 illustrates the generation of a cluster, subsequent performances of block 215 may involve updating an existing cluster, e.g. when an item 104 is within the radius 404 of an item that is already a member of a cluster.

Figure 5:
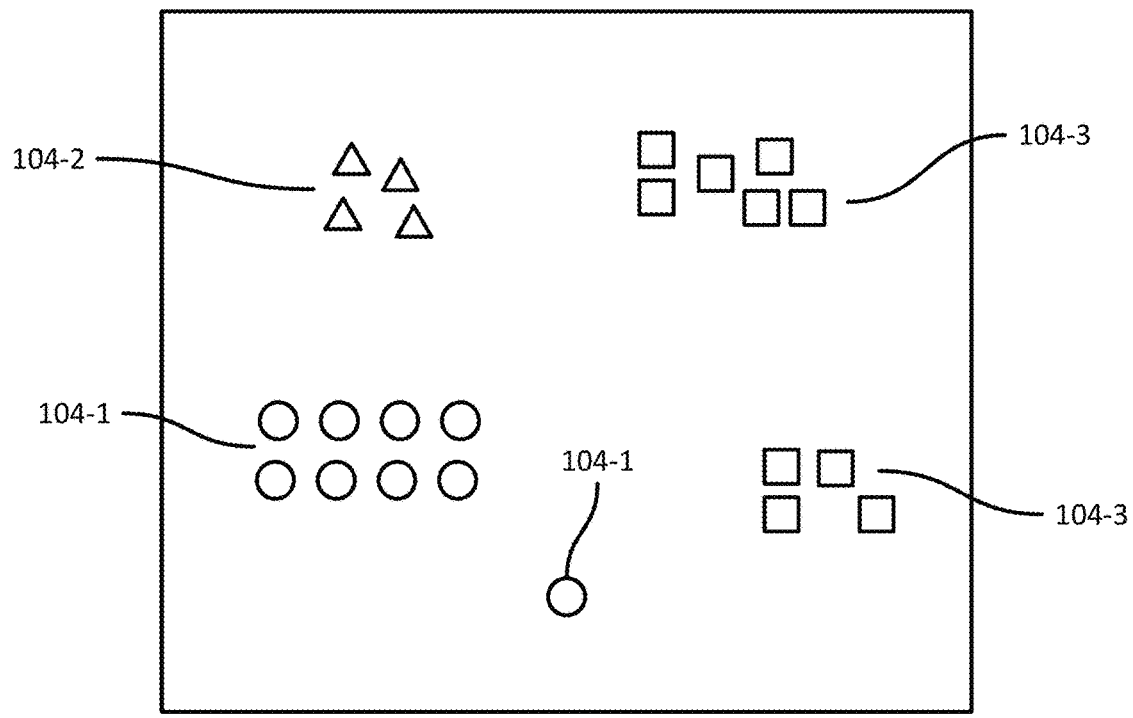
FIG. 5 is a diagram illustrating item cluster definitions generated via the method of FIG. 2.
Figure 5:
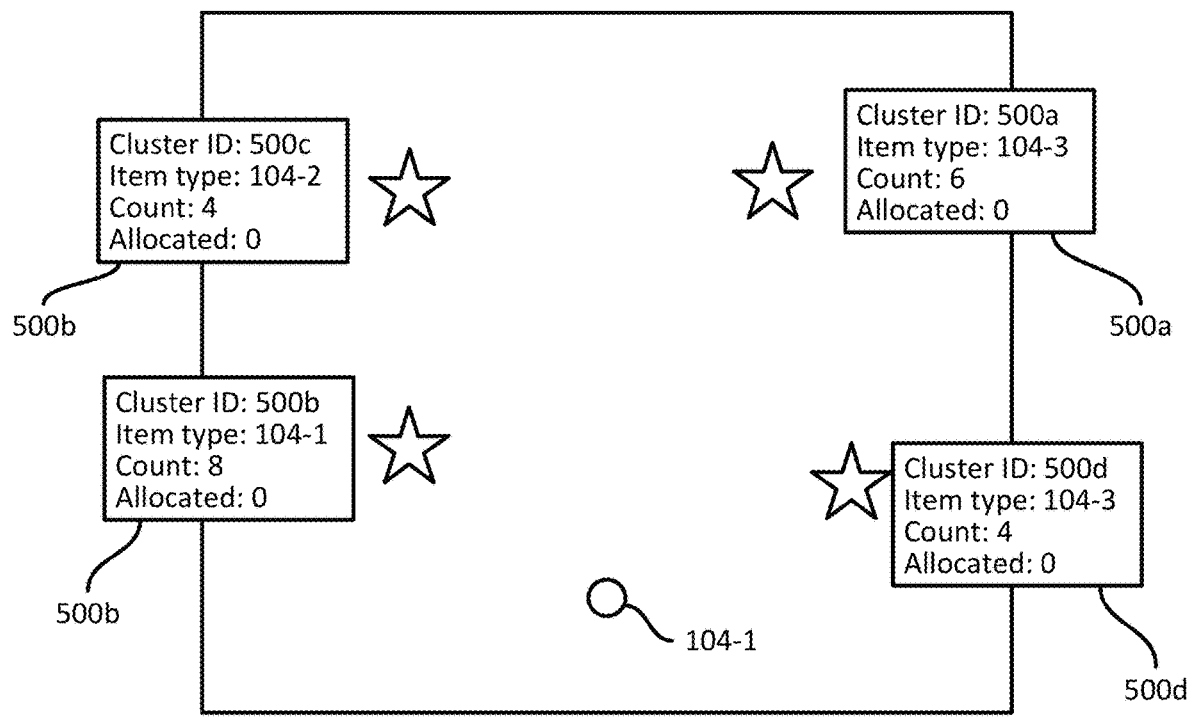

Turning to FIG. 5, the locations originally received at block 205 are illustrated in the upper half of the diagram, and the lower half of the diagram illustrates the result of processing each of those locations via blocks 210-225. In particular, the server 148 has generated four cluster definitions 500a, 500b, 500c, and 500d. One item 104-1 is also shown in the lower half of FIG. 5, as no cluster definition has been generated for that item. In some examples, single-item clusters may be generated for such items, but in the present example cluster definitions are generated only for sets of at least two items whose respective locations satisfy the proximity criterion.

As seen in FIG. 5, each cluster definition 500 includes various values defining the cluster 500. In particular, each cluster definition 500 includes at least a cluster location, indicated by the star icons in FIG. 5. The cluster location may be determined as the average or median of the locations of each member item 104 in the cluster. In other examples, the cluster location can be a set of coordinates defining an area or volume in the frame of reference 120, which contains the member items 104 of that cluster 500. In further examples where the cluster location is an area or volume, a confidence factor, such as a value between 0 to 1, may be associated with subregions within the area or volume, with higher confidence factors closer to the geometric average or median of the locations of each member item 104 in the cluster. In these further examples, the cluster location signifies where respective items 104 may reside, with more likelihood in the specific subregions with higher confidence factors.

Each cluster definition 500 can also contain an item type indicator that corresponds to the type of the items 104 in the cluster. Each cluster definition 500 also contains, in this example, a count of the items in the cluster, and a count of allocations made to the cluster. An allocation, as will be described below, indicates that the device 124 has been provided with the location of the cluster in order to retrieve an item therefrom. Thus, an instruction provided to the device 124 to retrieve more than one of the items in a cluster constitutes more than one allocation. The cluster definitions 500 are stored in the repository 164 for subsequent use in responding to item requests.

Returning to FIG. 2, when the determination at block 225 is negative indicating that all item locations have been processed and assigned to cluster definitions based on their proximities to other items 104, the server 148 proceeds to block 230. At block 230, the server 148 determines whether an item request has been received. An item request, as noted earlier, can include an incoming online order, an internal request for inventory (i.e. to be transported to another location in the facility rather than to be shipped out to a customer), a request to transfer inventory to another facility, or the like. The server 148 may maintain a queue of item requests that have not yet been processed and provided to the device 124, and when the queue is not empty, the determination at block 230 is affirmative. Various other mechanisms of managing incoming item requests may also occur to those skilled in the art.

When the determination at block 230 is negative, the server 148 can return to block 205 to await the receipt or generation of a further set of item locations, after which the cluster definitions 500 may be updated and/or regenerated. When the determination at block 230 is affirmative, however, the server 148 proceeds to block 235 to process any outstanding item requests.

An item request may define identifiers of one or more item types, but does not typically specify unique identifiers corresponding to the tags 116. For example, the item request may include an item's SKU or UPC but not an EPC. An item request may also define quantities for each item type. At block 235, the server 148 selects a client device to which instructions will be provided for retrieval of the items in the request. When the system 100 includes more than one device 124, the locations of each device 124 may be monitored periodically, and the server 148 may select a device 124 based on a comparison of the device locations to the locations of the requested item types. In some embodiments where multiple items 104 are to be retrieved, the server may split up the retrieval task request among multiple devices 124 if it determines that to be more efficient based on a comparison of the devices' locations to the locations of the requested item types. It will be apparent that the device selection methodology depending on item locations may be simplified significantly by employing cluster locations rather than individual item locations, as the number of comparisons may be reduced. For example, a device 124 may be selected by generating an aggregated distance between each device 124 and the collection of items 104 in the request and selecting the device 124 with the smallest aggregated distance. As seen in FIG. 5, assuming all three items types are requested, the use of cluster definitions enables such a selection to be performed by determining five distances for each device (for each of the four clusters 500, and for the unclustered item 104-1). In contrast, in the absence of the cluster generation mechanism described above, twenty-three distances must be evaluated for each device.

Furthermore, when there are multiple clusters of the same item type (e.g., 500a and 500d), the server 148 may also consider the item count of each cluster when deciding whether to include that cluster in the aggregated distance calculation. For example, an item request may include a quantity of five of item type 104-3. Knowing that cluster 500d has a count of four, the server may decide to exclude cluster 500d from the aggregated distance determination since cluster 500d's item count is insufficient to satisfy on its own the request for that item. Likewise, the server 148 may also exclude an unclustered item in the aggregated distance determination if the item request is for a quantity of more than one of that item type. In another example, the server 148 may exclude an unclustered item in the aggregated distance determination if the location tracking system determines this item to be unavailable for retrieval, such as when it is already in the possession of a customer. Technology components such as those based on image and/or video capture and analysis may be utilized by the location tracking system in order to classify the unclustered item as unavailable. Such technology components can also be used by the location tracking system to determine that an unclustered item is presently stored in the wrong location, as opposed to simply being the last remaining item stored on the correct support structure 108 per the planogram. In this example, the server 148 may include or give priority to the location of this unclustered item in the aggregated distance determination so that its incorrect and unwanted location is no longer "hidden" from customers (i.e. not where it is expected to be).

Alternatively, the server 148 may consider multiple aggregated distance options, some of which would require the worker with device 124 to travel to multiple clusters of the same item type in order to retrieve a sufficient quantity of items to satisfy the item request. There may be situations, for example, where the aggregated distance is actually smaller when two clusters with relatively smaller item counts are closer to a device 124 than when one cluster with a relatively larger item count is much further from the device 124.

In addition, there are embodiments where the server 148 also takes into account the location type of the cluster's location when considering which device 124 to select for providing instructions for retrieval of the items 104. For example, if the item request is to fulfill an online order, it may be preferred for the worker to not retrieve the item from a location that is highly frequented by in-store customers, such as an endcap, and instead retrieve the item from a location not as highly frequented by in-store customers. This will help maximize the count of items 104 in the high consumer traffic area so that it remains easily available for retrieval by in-store customers and does not go of out of stock at this location. Otherwise, if facility workers retrieve too many items 104 from the endcap in this example to the point where the workers empty the endcap and leave it with no items, in-store customers who are not aware of the other locations for this item 104 will not retrieve the item, which makes for both poor customer experiences as well as lost business opportunities for the retailer. In this example, the server may therefore disregard the endcap location from the aggregated distance calculation.

Further, the server may pair the cluster's location type with the cluster's item count when making its consideration at block 235. In a modification to the previous example, if the endcap has one-hundred items 104 and the less frequented location only has five items 104, the aggregated distance calculation may include the endcap location when determining which device 124 to select for providing instructions for retrieval of the items 104. In another example, if there are two endcaps with items 104 in two different locations, the server may prioritize selecting the device 124 closer to the endcap where there are more items 104 in order to provide a better opportunity for in-store customers to still find multiple locations with a sufficient quantity of items 104. In all of these examples and scenarios, the methodology of selecting device 124 is simplified with the use of cluster locations.

At block 240, having selected a device 124, the server 148 is configured to select and send location data for the requested items to the selected device 124. The location data selected for transmission to the device 124 at block 240 can include, in some examples, the location of every cluster definition 500 and/or unclustered item 104 that share item types with the item types in the request from block 230. In other examples, when multiple locations exist for a given item type (e.g. the item type 104-3, for which two cluster definitions 500a and 500d were generated), the server 148 may select a single location from those available. Such a selection may be based on proximity to the current location of the device 124, or on the item count for a cluster 500, e.g. with a preference to select larger clusters. In any event, the server 148 preferably does not select a cluster for which the allocation count equals the item count. The allocation count indicates the number of items in a cluster that have already been assigned to the device 124 (or other devices 124) for retrieval, and therefore may be removed shortly from the cluster 500. The server 148 also preferably does not select a cluster for which the quantity of items of a specific item type in the item request exceeds the cluster's item count minus its allocation count for that item type. Otherwise, there may not be enough items of that item type at that cluster location to satisfy the item request, or if there are, retrieving those items from that cluster location may interfere with or even prevent an already planned retrieval of items associated with a previously set allocation. In other examples, the server 148 may determine that in order to retrieve the full quantity of items for an item type in an item request, multiple cluster locations may need to be specified based on the item count in each cluster. For example, if an item request includes a quantity of seven of item type 104-3, the server 148 may select and send location data for clusters 500a and 500d to the device 124 since neither cluster alone has an item count of at least seven, but the sum of the item counts of both clusters exceeds seven.

The location data transmitted at block 240 can also include a requested item count for each item type, indicating how many of each item type must be retrieved. The location data may be rendered on the display region 134 of the HUD 128 upon receipt by the device 124, providing guidance to the relevant items and/or clusters to the operator of the HUD 128. Of particular note, such guidance may be provided while minimizing the volume of data transmitted to the device 124 and presented on the display region 134.

In some embodiments, the server 148 may dynamically update the location data sent to a device 124 based on changes detected by the real time location tracking system. Further, the server 148 may modify the instructions for the retrieval of the items 104 and/or change which device 124 those instructions are sent to. This may be needed, for example, when the location tracking system detects that items that were to be retrieved have been moved, and therefore changed locations, before the worker carrying the device 124 that the instructions were provided to was able to actually retrieve the items.

At block 245, the server 148 can update allocation counts for any of the clusters included in the location data sent at block 240. For example, if the location data sent at block 240 includes an item count as noted above, the allocation count of the corresponding cluster definition 500 may be incremented by a number equal to the item count.

Following block 245, the server 148 can return to block 205 and await the receipt of further item locations. As will be apparent, the locations of items 104 may change in the facility in response to retrieval of such items by customers, by the worker operating the device 124, and the like. Based on tracking the unique identifiers, such as EPCs, that correspond to the tags 116 affixed to items 104, the location sensors 112 of the location tracking system detect the specific items 104 retrieved. Those retrieved items can be taken out of inventory, and the resulting average item location that defines the cluster location of that item type (e.g. for that SKU or UPC) may be updated. Locations of items 104 may also change in the facility as new items are received, for example as retail inventory is replenished with new orders and/or customers return items 104 to the facility. Periodically repeating the collection and processing of item locations enables the server 148 to maintain up-to-date information with which to provide fulfillment guidance to the device 124. In some examples, rather than regenerating the cluster definitions entirely during each performance of the method 200, the server 148 can determine whether items that satisfy the proximity criterion at block 215 were previously members of a cluster with a cluster location within a threshold distance of the current cluster location. When that determination is positive, information associated with the previous cluster definition, such as the allocation count, may be copied over to the current cluster definition. As will also be apparent, when the server 148 receives an indication that an item request has been completed (i.e. all the items in the item request have been retrieved), the server 148 may update the item count by subtracting the allocation count from the item count and may decrement the allocation count previously incremented. In such examples, the server 148 may therefore store not only allocation counts with cluster definitions, but also item request identifiers, enabling the server 148 to identify which clusters 500 to decrement upon completion of an item request.

In some examples, once the location tracking system has determined the locations of a sufficient number of items 104, the determination at block 225 whether items remain to be processed and potentially assigned clusters may be bypassed. This example may be more typical of when the location tracking system is first initialized rather than once it is operational for an extended period of time and a baseline has been established, from which point the system then primarily tracks item location changes. In these examples, this bypass provides a practical and timely opportunity to determine whether item requests are received at block 230, thereby avoiding a potential backlog of such requests. In further examples, block 225 may be bypassed at periodic intervals, after specifically defined time duration thresholds, and/or at certain times of day and/or certain days.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A computing device, comprising:
a memory;
a communications interface; and
a processor configured to:
obtain, from a real time location tracking system deployed in a facility containing items of a plurality of item types, a current location for each item based on a radio frequency identification (RFID) tag associated with each item and detected by at least one sensor of the real time location tracking system;
select a subset of the items (i) having a common type, and (ii) satisfying a proximity criterion indicative of each item of the subset of the items being within a threshold distance of one another in the facility;
generate and store, in the memory, an item cluster definition having (i) a type indicator corresponding to the common type, (ii) a count of items in the subset, and (iii) a single cluster location derived from the current locations of the items in the subset;
obtain an item request including at least one item type among the plurality of item types;
determine that the at least one item type matches the type indicator of the cluster definition; and
responsive to the determination, send at least a portion of the cluster definition to a mobile device within the facility.

2. The computing device of claim 1, wherein the cluster definition includes unique identifiers associated with each of the subset of items.

3. The computing device of claim 1, wherein the cluster location is an average of the current locations of the subset of items.

4. The computing device of claim 1, wherein the cluster definition includes an allocation count.

5. The computing device of claim 1, wherein the cluster definition includes the cluster location and excludes the current locations of the subset of items.

6. The computing device of claim 1, wherein the processor is configured to assess the proximity criterion by:
selecting a first item;
determining that a second item having the same type is within a threshold distance of the first item; and
generating the cluster definition based on the first and second items.

7. The computing device of claim 6, wherein the processor is further configured to:
select a third item;
determine that the third item is within the threshold distance of either of the first and second items; and
add the third item to the cluster definition.

8. A method, comprising:
obtaining, from a real time location tracking system deployed in a facility containing items of a plurality of item types, a current location for each item based on a radio frequency identification (RFID) tag associated with each item and detected by at least one sensor of the real time location tracking system;
selecting a subset of the items (i) having a common type, and (ii) satisfying a proximity criterion indicative of each item of the subset of the items being within a threshold distance of one another in the facility;
generating and storing an item cluster definition having (i) a type indicator corresponding to the common type, (ii) a count of items in the subset, and (iii) a single cluster location derived from the current locations of the items in the subset;
obtaining an item request including at least one item type among the plurality of item types;
determining that the at least one item type matches the type indicator of the cluster definition; and
responsive to the determination, sending at least a portion of the cluster definition to a mobile device within the facility.

9. The method of claim 8, wherein the cluster definition includes unique identifiers associated with each of the subset of items.

10. The method of claim 8, wherein the cluster location is an average of the current locations of the subset of items.

11. The method of claim 8, wherein the cluster definition includes an allocation count.

12. The method of claim 8, wherein the cluster definition includes the cluster location and excludes the current locations of the subset of items.

13. The method of claim 8, further comprising assessing the proximity criterion by:
   selecting a first item;
   determining that a second item having the same type is within a threshold distance of the first item; and
   generating the cluster definition based on the first and second items.

14. The method of claim 13, further comprising:
   selecting a third item;
   determining that the third item is within the threshold distance of either of the first and second items; and
   adding the third item to the cluster definition.

15. A system, comprising:
   a mobile device;
   a real time location tracking system; and
   a server configured to:
      obtain, from the real time location tracking system deployed in a facility containing items of a plurality of item types, a current location for each item based on a radio frequency identification (RFID) tag associated with each item and detected by at least one sensor of the real time location tracking system;
      select a subset of the items (i) having a common type, and (ii) satisfying a proximity criterion indicative of each item of the subset of the items being within a threshold distance of one another in the facility;
      generate and store an item cluster definition having (i) a type indicator corresponding to the common type, (ii) a count of items in the subset, and (iii) a single cluster location derived from the current locations of the items in the subset;
      obtain an item request including at least one item type among the plurality of item types;
      determine that the at least one item type matches the type indicator of the cluster definition; and
      responsive to the determination, send at least a portion of the cluster definition to the mobile device.

16. The system of claim 15, further comprising:
   a head-mounted display connected to the mobile device and configured to present the portion of the cluster definition.

17. The system of claim 15, wherein the cluster definition includes unique identifiers associated with each of the subset of items.

18. The system of claim 15, wherein the cluster location is an average of the current locations of the subset of items.

19. The system of claim 15, wherein the cluster definition includes an allocation count.

20. The system of claim 15, wherein the cluster definition includes the cluster location and excludes the current locations of the subset of items.

* * * * *